March 24, 1959 R. SOLISCH 2,878,724
ASYMMETRICAL PHOTOGRAPHIC OR CINEMATOGRAPHIC
OBJECTIVE WITH LARGE ANGLE OF VIEW
Filed Oct. 29, 1957
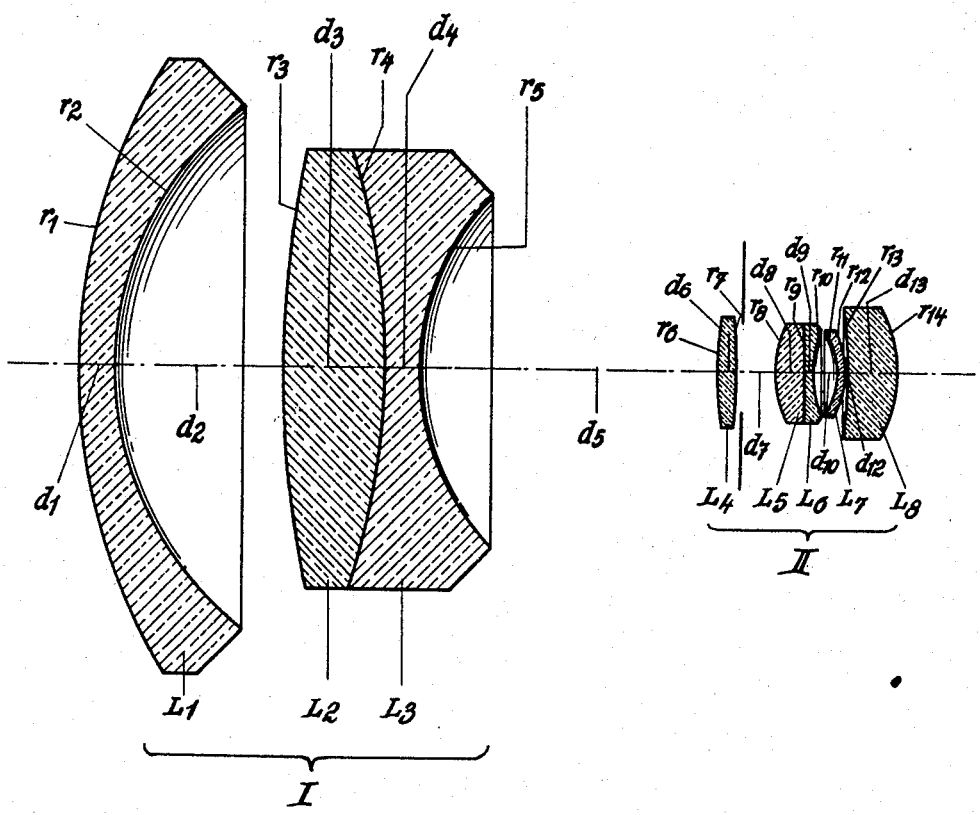
INVENTOR.
Rudolf SOLISCH
BY
Karl F. Ross
AGENT

United States Patent Office 2,878,724
Patented Mar. 24, 1959

2,878,724

ASYMMETRICAL PHOTOGRAPHIC OR CINEMATOGRAPHIC OBJECTIVE WITH LARGE ANGLE OF VIEW

Rudolf Solisch, Gottingen, Germany, assignor to Isco Optische Werke G.m.b.H., Gottingen-Weende, Germany, a corporation of Germany Application October 29, 1957, Serial No. 693,076

Claims priority, application Germany November 10, 1956

3 Claims. (Cl. 88—57)

The present invention relates to an asymmetrical wide-angle objective for photographic or cinematographic systems.

An object of my invention is to provide an improved objective system of the character set forth whose back-focal distance is greater than its overall focal length, this being particularly advantageous in the case of objectives of short focal length designed to be used in combination with auxiliary equipment, such as a mirror of a reflex-type camera, which must be accommodated in the space between the rearmost objective component and its image plane.

A more specific object of this invention is to provide an objective system of the above character which is substantially free from coma and other aberrations.

An objective system according to the invention comprises, fundamentally, a dispersive front group and a multi-component collective rear group, the two groups being separated by a relatively large air space which may exceed the overall focal length of the system. The front group consists, in accordance with a more particular feature of my invention, of two air-spaced negative menisci of which the more forwardly positioned one is a single uncemented lens, the other meniscus of this group being composed of two lens members of opposite refractivity cemented together along a surface turning a distinctly concave side toward the first-mentioned meniscus, i.e. toward the side of the longer light rays. The refractive indices of the two cemented members preferably differ by a value greater than 0.15. Moreover, the air space separating the two menisci of this front group should advantageously range between substantially 60% and 75% of the overall focal length of the system.

According to another feature of my invention, designed to afford effective elimination of residual coma, the rear group of the system consists of four air-spaced components of which the most forwardly positioned one is a positive lens separated from the immediately succeeding component by a distance preferably ranging between substantially 14% and 18% of the overall focal length of the system, the space between these two components advantageously serving as a diaphragm space. The second component of the rear group, i.e. the one immediately following the diaphragm, is a negatively refracting cemented lens whose two constitutive members of opposite refractivity differ in their refractive indices by a value exceeding 0.25.

The invention will be described in greater detail with reference to the accompanying drawing the sole figure of which shows an objective system representing a preferred embodiment.

In the drawing there is shown at I a front group consisting of a single negative meniscus $L_1$ (radii $r_1$, $r_2$ and thickness $d_1$) and, following it, a compound negative meniscus composed of a positive member $L_2$ (radii $r_3$, $r_4$ and thickness $d_3$) and of a negative member $L_3$ (radii $r_4$, $r_5$ and thickness $d_4$) cemented together at their surface $r_4$ which is concave toward lens $L_1$, the two menisci being separated by an air space $d_2$. A large air space $d_5$ separates front group I from a rear group II whose first component $L_4$ is a positive lens (radii $r_6$, $r_7$ and thickness $d_6$) and whose next component, defining with it a diaphragm space of axial length $d_7$, is cemented together from a positive member $L_5$ (radii $r_8$, $r_9$ and thickness $d_8$) and a negative member $L_6$ (radii $r_9$, $r_{10}$ and thickness $d_9$). A negative meniscus $L_7$ (radii $r_{11}$, $r_{12}$ and thickness $d_{11}$), separated from compound lens $L_5$, $L_6$ by an air space $d_{10}$, represents the third component of the group whose last component is a positive meniscus $L_8$ (radii $r_{13}$, $r_{14}$ and thickness $d_{13}$), the air space between lenses $L_7$ and $L_8$ having been designated $d_{12}$.

Representative values of the parameters $r_1$–$r_{14}$ and $d_1$–$d_{13}$ of an objective system as shown in the drawing, having an aperture ratio of 1:3, an overall focal length of numerical value 100, a back-focal distance of numerical value 152.3 and a field angle exceeding 80°, are listed in the following table:

|   |   |   |   | $n_d$ | $v_d$ |
|---|---|---|---|---|---|
| I | $L_1$ | $r_1 = +223.49$ | $d_1 = 14.13$ | 1.4989 | 65.2 |
|   |   | $r_2 = +127.27$ | $d_2 = 68.64$ | air space |   |
|   | $L_2$ | $r_3 = +583.69$ | $d_3 = 39.97$ | 1.6989 | 30.1 |
|   |   | $r_4 = -290.71$ |   |   |   |
|   | $L_3$ | $r_5 = +96.90$ | $d_4 = 14.13$ | 1.5014 | 56.5 |
|   |   |   | $d_5 = 119.11$ | air space |   |
| II | $L_4$ | $r_6 = +135.46$ | $d_6 = 8.08$ | 1.7387 | 28.2 |
|   |   | $r_7 = -310.90$ | $d_7 = 16.15$ | diaphragm space |   |
|   | $L_5$ | $r_8 = +42.59$ | $d_8 = 10.50$ | 1.4707 | 67.2 |
|   | $L_6$ | $r_9 = \infty$ | $d_9 = 3.63$ | 1.8069 | 25.5 |
|   |   | $r_{10} = +43.20$ | $d_{10} = 9.29$ | air space |   |
|   | $L_7$ | $r_{11} = -28.26$ | $d_{11} = 4.85$ | 1.7603 | 26.5 |
|   |   | $r_{12} = -34.86$ | $d_{12} = 0.40$ | air space |   |
|   | $L_8$ | $r_{13} = -189.77$ | $d_{13} = 18.98$ | 1.6385 | 55.5 |
|   |   | $r_{14} = -51.68$ |   |   |   |

The designations $n_d$ and $v_d$ represent, respectively, the refractive indices and the Abbé numbers of lenses $L_1$–$L_8$.

As will be noted from the foregoing table, the refractive indices of positive member $L_5$ of the second component of front group I exceeds by a value of 0.1975 that of lens member $L_3$ cemented to it at the forwardly concave surface $r_4$, the difference of refractive indices across this surface being thus greater than 0.15. The air space $d_2$ between components $L_1$ and $L_2$–$L_3$ equals 68.64, being thus between 60% and 75% of the overall focal length. Air space $d_7$ between the two formost components $L_4$ and $L_5$–$L_6$ of rear group II, which serves as a diaphragm space, has a numerical length of 16.15 which is thus between 14% and 18% of the overall focal length. Finally, the refractive index of lens member $L_6$ exceeds by a value of 0.3362 that of lens member $L_5$ cemented to it at surface $r_9$, the difference of the refractive indices across that surface being thus greater than 0.25.

I claim:
1. An objective system comprising six air-spaced components including a negative first component constituted by a single meniscus-shaped lens, a meniscus-shaped negative second component consisting of two lenses of opposite refractivity cemented together, a positive third component consisting of a single lens, a negative fourth component consisting of two lenses of opposite refractivity cemented together, a negative fifth component in the form of a single lens and a positive sixth component in the form of a single lens, said second and third components being separated from each other by an air space of an axial length exceeding the overall focal length of the system, the lens members of said second component having refractive indices differing by a value at least equal to 0.15, said first and second components being separated from each other by a distance ranging substantially between 60% and 75% of said overall focal length, the lens members of said fourth component having refractive indices differing by a value at least equal to 0.25, said third and fourth components being separated from each other by a distance ranging substantially between 14% and 18% of said overall focal length.

2. An objective system according to claim 1, further comprising diaphragm means in the air space between said third and fourth components.

3. An objective system according to claim 1, having an overall focal length of numerical value 100, wherein the radii $r_1$–$r_{14}$ and the thicknesses and spacings $d_1$–$d_{13}$ of the lenses $L_1$–$L_8$ of said first, second, third, fourth, fifth and sixth components, their refractive indices $n_d$ and their Abbé numbers $v_d$ have numerical values substantially as given in the following table:

| | | | $n_d$ | $v_d$ |
|---|---|---|---|---|
| $L_1$ | $r_1 = +223.49$ | $d_1 = 14.13$ | 1.4989 | 65.2 |
| | $r_2 = +127.27$ | $d_2 = 68.64$ | air space | |
| $L_2$ | $r_3 = +533.69$ | $d_3 = 39.97$ | 1.6989 | 30.1 |
| $L_3$ | $r_4 = -290.71$ | $d_4 = 14.13$ | 1.5014 | 56.5 |
| | $r_5 = +96.90$ | $d_5 = 119.11$ | air space | |
| $L_4$ | $r_6 = +135.46$ | $d_6 = 8.08$ | 1.7387 | 28.2 |
| | $r_7 = -310.90$ | $d_7 = 16.15$ | air space | |
| $L_5$ | $r_8 = +42.59$ | $d_8 = 10.50$ | 1.4707 | 67.2 |
| $L_6$ | $r_9 = \infty$ | $d_9 = 3.63$ | 1.8060 | 25.5 |
| | $r_{10} = +43.20$ | $d_{10} = 9.29$ | air space | |
| $L_7$ | $r_{11} = -28.26$ | $d_{11} = 4.85$ | 1.7603 | 26.5 |
| | $r_{12} = -34.86$ | $d_{12} = 0.40$ | air space | |
| $L_8$ | $r_{13} = -189.77$ | $d_{13} = 18.98$ | 1.6385 | 55.5 |
| | $r_{14} = -51.68$ | | | |

References Cited in the file of this patent
UNITED STATES PATENTS

| | | |
|---|---|---|
| 1,863,099 | Bowen | June 14, 1932 |
| 1,910,492 | Mellor | May 23, 1933 |
| 2,785,603 | Cook | Mar. 19, 1957 |
| 2,826,117 | Mukai | Mar. 11, 1958 |